(12) United States Patent
Kim

(10) Patent No.: US 11,873,027 B2
(45) Date of Patent: Jan. 16, 2024

(54) REAR VEHICLE BODY STRUCTURE

(71) Applicants: HYUNDAI MOTOR COMPANY, Seoul (KR); KIA CORPORATION, Seoul (KR)

(72) Inventor: Sung Won Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 174 days.

(21) Appl. No.: 17/523,393

(22) Filed: Nov. 10, 2021

(65) Prior Publication Data
US 2022/0340208 A1  Oct. 27, 2022

(30) Foreign Application Priority Data
Apr. 26, 2021  (KR) .......................... 10-2021-0053575

(51) Int. Cl.
 *B62D 25/08* (2006.01)
 *B62D 25/20* (2006.01)
 *B62D 21/15* (2006.01)
 *B62D 43/10* (2006.01)

(52) U.S. Cl.
 CPC .......... *B62D 25/08* (2013.01); *B60Y 2304/07* (2013.01); *B60Y 2306/01* (2013.01); *B62D 21/15* (2013.01); *B62D 25/2027* (2013.01); *B62D 43/10* (2013.01)

(58) Field of Classification Search
 CPC .... B62D 25/08; B62D 43/10; B62D 25/2027; B62D 21/15; B60Y 2304/07; B60Y 2306/01
 USPC ..................................................... 296/203.04
 See application file for complete search history.

(56) References Cited

U.S. PATENT DOCUMENTS

| | | | |
|---|---|---|---|
| 7,954,887 B2 * | 6/2011 | Sakamoto | B62D 25/2027 296/37.2 |
| 9,010,847 B2 * | 4/2015 | Katou | B62D 25/2027 296/193.08 |

FOREIGN PATENT DOCUMENTS

| | | | |
|---|---|---|---|
| JP | 2012-096718 A | | 5/2012 |
| JP | 2012096718 A | * | 5/2012 |

* cited by examiner

*Primary Examiner* — Amy R Weisberg
*Assistant Examiner* — Dana D Ivey
(74) *Attorney, Agent, or Firm* — MCDONNELL BOEHNEN HULBERT & BERGHOFF LLP

(57) ABSTRACT

A rear vehicle body structure may include a rear side member connected to a back beam provided at the rear of the vehicle body, and a rear floor including a rear floor side portion with which the rear side member is connected, a tire wall formed with concave step from the rear floor side portion, and a rear floor transverse reinforcement formed protrude along the shape of the rear floor side portion and the tire wall from the rear of the rear floor side portion and the tire wall.

15 Claims, 9 Drawing Sheets

REAR VEHICLE BODY STRUCTURE

CROSS REFERENCE TO RELATED APPLICATIONS

This application claims priority to and the benefit of Korean Patent Application No. 10-2021-0053575 filed in the Korean Intellectual Property Office on Apr. 26, 2021, the entire contents of which are incorporated herein by reference.

BACKGROUND

(a) Field

The present disclosure relates to a rear vehicle body structure. More particularly, the present disclosure relates to a rear vehicle body structure with improved vehicle body strength and impact performance.

(b) Description of the Related Art

In the vehicle body, the connection structure of the rear floor, the back panel and the side part strengthens the vehicle body strength, prevents the torsion of the tail gate, and plays a role in preventing deformation of the vehicle body and absorbing energy in the event of a rear collision.

It responds to vehicle body deformation so that it has a road pass from the rear back beam to the side member in the event of a rear collision, and prevents the deformation of the fuel tank to minimize fuel leakage and injury to the rear seat occupant.

In designing the rear vehicle body structure, it is necessary to respond to the torsion of the gate opening in consideration of the closing performance and quality of the tail gate.

In addition, in designing the rear vehicle body structure, the strength against vehicle body torsion must be maintained to satisfy the R&H (Ride and Handling) performance of the vehicle.

However, in the general rear vehicle body structure, the vehicle body deforms excessively because only the side member supports the load coming into the rear back beam during a rear collision.

In other words, it is difficult to respond to twisting of the tail gate opening and secure vehicle body strength with the annular connection structure of the back panel transverse member and the D pillar part.

Therefore, a separate member for connecting the rear floor, side member and back panel is required.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a rear vehicle body structure with improved vehicle body strength and rear impact performance.

A rear vehicle body structure according to an exemplary embodiment of the present disclosure may include a rear side member connected to a back beam provided at the rear of the vehicle body, and a rear floor including a rear floor side portion with which the rear side member is connected, a tire wall formed with concave step from the rear floor side portion, and a rear floor transverse reinforcement formed protrude along the shape of the rear floor side portion and the tire wall from the rear of the rear floor side portion and the tire wall.

The rear vehicle body structure according to an exemplary embodiment of the present disclosure may further include a rear side portion provided on the side of the vehicle body, wherein the rear floor transverse reinforcement includes a reinforcement extension formed to extend in the vehicle body width direction and connected with the rear side portion.

The rear vehicle body structure according to an exemplary embodiment of the present disclosure may further include a back panel connected with the rear of the rear floor.

The rear floor may further include a rear floor rear flange that is curved from the rear floor transverse reinforcement and connected with the back panel.

The rear floor rear flange may include a rear floor center flange formed in the vehicle body width direction at a position corresponding to the tire wall, a rear floor connection flange curved upward from the rear floor center flange, and an extension flange formed along the reinforcement extension by being curved from the rear floor connection flange.

The back panel may include a back panel reinforcement flange bent in the forward direction of the vehicle body to form a closed cross-section with the rear floor center flange and the rear floor connection flange with a "U" shape and to be connected with the rear floor.

The back panel may be connected to the rear side portion.

The rear vehicle body structure according to an exemplary embodiment of the present disclosure may further include a transverse member connected to the front of the back panel and connected to the rear side portion.

The transverse member may include a transverse member body protruded toward the front of the vehicle body to combine with the back panel to form a closed cross-section.

The rear vehicle body structure according to an exemplary embodiment of the present disclosure may further include a transverse member bulk head provided between the transverse member and the back panel.

The transverse member may further include a transverse member lower flange curved from the transverse member body and connected with the back panel, and a transverse member upper flange curved from the transverse member body and connected with the back panel.

The transverse member lower flange may be connected with the extension flange.

The transverse member may include a transverse member side portion engaged with the rear side portion, a transverse member central portion disposed in the vehicle body width direction, and a transverse member connection connecting the transverse member side portion and the transverse member central portion.

The rear side member may include a rear side member body formed as a "U" cross-section along the vehicle body length direction, and a rear side member flange curved from the rear side member body.

The rear side member flange may include a rear side member outer flange connected with the lower of the rear floor side portion and the rear side portion, and a rear side member inner flange connected with the bottom surface of the rear floor.

The rear vehicle body structure according to an exemplary embodiment of the present disclosure may further include a rear wheel housing connected with the rear side portion and the rear floor, and a wheel housing connection connected with the rear side portion, the rear wheel housing and the rear side member outer flange.

The rear portion of the rear side member inner flange may include an inner flange extension formed to extend inside the vehicle body.

The rear vehicle body structure according to an exemplary embodiment of the present disclosure may further include a side member bulk head connecting the rear side member body and the rear floor.

According to the rear vehicle body structure according to an exemplary embodiment of the present disclosure, vehicle body strength and rear collision performance may be improved.

According to the rear vehicle body structure according to an exemplary embodiment of the present disclosure, main components of the rear vehicle body structure may be connected without a separate configuration, so the vehicle body assembly process may be simplified.

According to the rear vehicle body structure according to an exemplary embodiment of the present disclosure, it is possible to suppress the deformation of the vehicle body by forming a plurality of road paths that transmit the collision load when the vehicle body rear impacts.

In addition, for the effects that may be obtained or predicted due to an exemplary embodiment of the present disclosure, it is to be disclosed directly or implicitly in the detailed description of an exemplary embodiment of the present disclosure. That is, various effects predicted according to an exemplary embodiment of the present disclosure will be disclosed within a detailed description to be described later.

BRIEF DESCRIPTION OF THE FIGURES

Since these drawings are for reference in describing an exemplary embodiment of the present disclosure, the technical spirit of the present disclosure should not be interpreted as being limited to the accompanying drawings.

DETAILED DESCRIPTION

Figure 1:
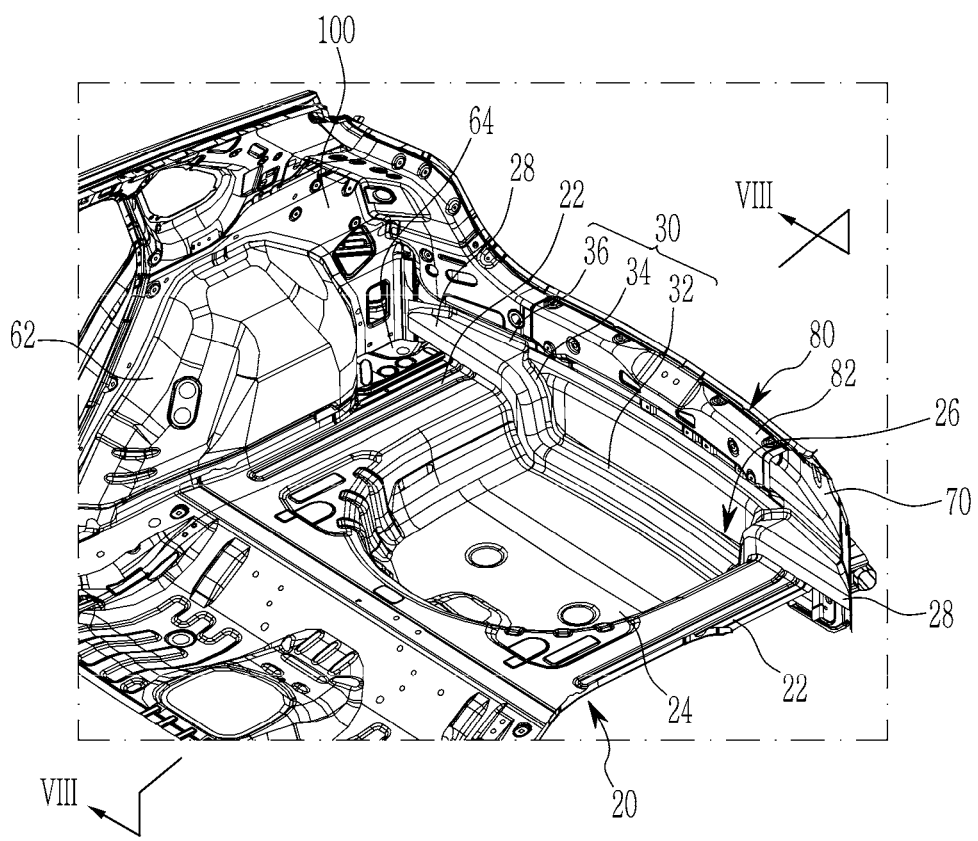
FIG. 1 is a perspective view of the rear vehicle body structure according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly describe the present disclosure, parts irrelevant to the description are omitted, and the same reference numerals are assigned to the same or similar elements throughout the specification.

Since the size and thickness of each component shown in the drawings are arbitrarily indicated for convenience of description, the present disclosure is not necessarily limited to the bar shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as . . . part, . . . means described in the specification mean a unit of a comprehensive configuration that performs at least one function or operation.

When a part, such as a layer, film, region, plate, etc., is "on" another part, it includes the case where it is directly on the other part as well as the case where there is another part in between.

In contrast, when an element is referred to as being "directly on" another element, there are no intervening elements present.

An exemplary embodiment of the present disclosure will hereinafter be described in detail with reference to the accompanying drawings.

Figure 2:
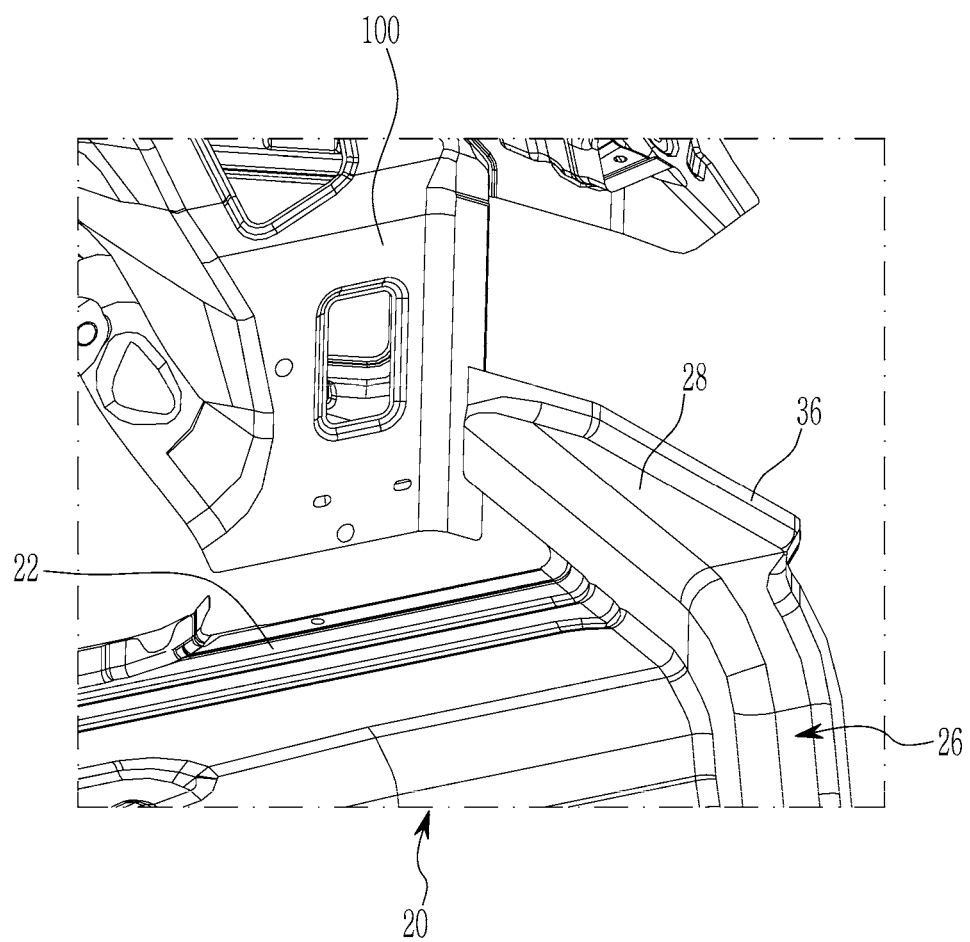
FIG. 2 is a partial bottom perspective view of a rear body structure according to an embodiment of the present disclosure.
Figure 3:
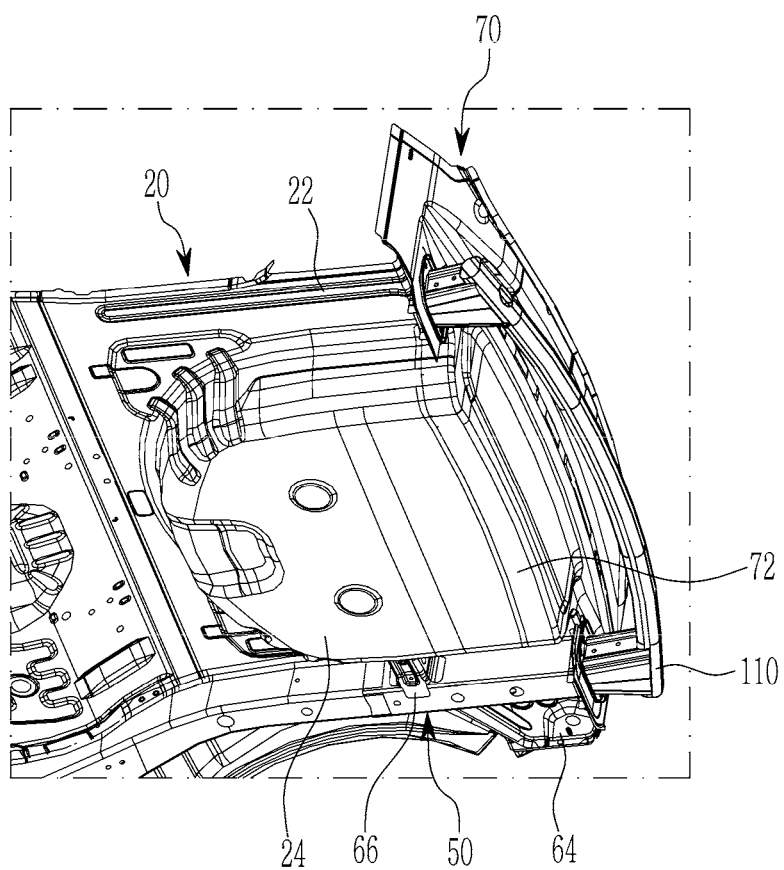
FIG. 3 is a partial perspective view of a rear body structure according to an embodiment of the present disclosure.

FIG. 1 is a perspective view of the rear vehicle body structure according to an exemplary embodiment of the present disclosure, FIG. 2 is a partial bottom perspective view of a rear body structure according to an embodiment of the present disclosure, and FIG. 3 is a partial perspective view of a rear body structure according to an embodiment of the present disclosure.

Referring to FIG. 1 to FIG. 3, a rear vehicle body structure 10 according to an exemplary embodiment of the present disclosure may include a rear side member 50 connected to a back beam 110 provided at the rear of the vehicle body, and a rear floor 20.

In the drawings, some components are omitted for convenience of understanding, and the left and right components of the vehicle body may include symmetric constituent elements.

The rear floor 20 may include a rear floor side portion 22 to which the rear side member 50 is connected, a tire wall 24 formed with a concave step from the rear floor side portion 22, and a rear floor transverse reinforcement 26 protruding along the shapes of the rear floor side portion 22 and the tire wall 24 from the rear of the rear floor side portion 22 and the tire wall 24

The rear vehicle body structure 10 according to an exemplary embodiment of the present disclosure may further include a rear side portion 100 provided on the side of the vehicle body, and the rear floor transverse reinforcement 26 may include a reinforcement extension 28 extending in the vehicle body width direction and connected to the rear side portion 100.

The rear vehicle body structure 10 according to an exemplary embodiment of the present disclosure may further include a back panel 70 coupled to the rear of the rear floor 20.

The rear floor 20 may further include a rear floor rear flange 30 that is curved away from the rear floor transverse reinforcement 26 and connected with the back panel 70.

The rear floor rear flange 30 may include a rear floor center flange 32 formed in the vehicle body width direction at a position corresponding to the tire wall 24, a rear floor connection flange 34 curved upward from the rear floor center flange 32, and an extension flange 36 which is curved away from the rear floor connection flange 34 and formed along the reinforcement extension 28.

The rear floor center flange 32, the rear floor connection flange 34, and the extension flange 36 may be bent in the rear floor transverse reinforcement 26 to increase the strength of the rear floor transverse reinforcement 26.

In addition, the rear floor transverse reinforcement 26 on which the rear floor rear flange 30 is formed is formed along the shape of the rear floor side portion 22 and the tire wall 24, and is connected to the rear side portion 100 through the reinforcement extension 28, and thus the width direction strength of the body may be secured.

Figure 4:
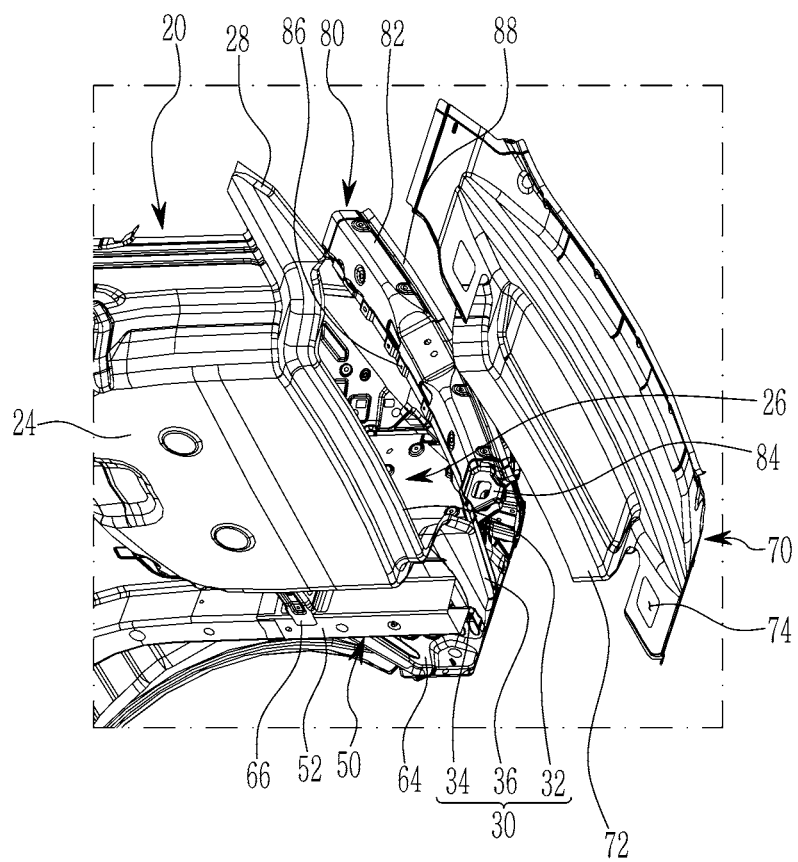
FIG. 4 is a partially exploded perspective view of a rear body structure according to an embodiment of the present disclosure.
Figure 5:
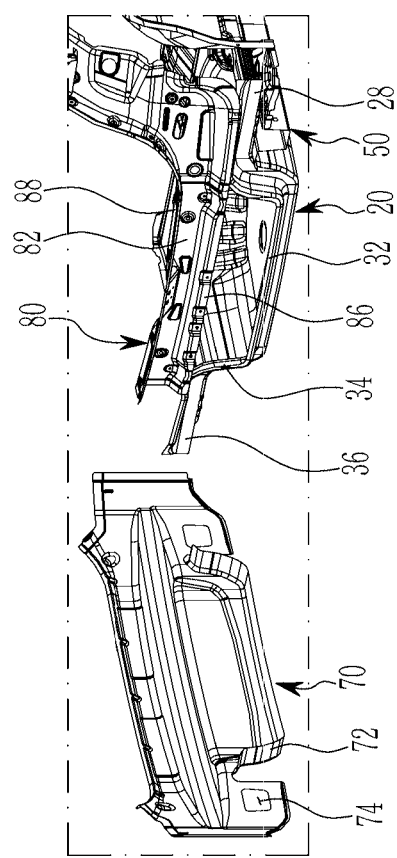
FIG. 5 is a partially exploded perspective view viewed from the rear of the rear vehicle body structure according to an exemplary embodiment of the present disclosure.

FIG. 4 is a partially exploded perspective view of a rear body structure according to an embodiment of the present disclosure, and FIG. 5 is a partially exploded perspective view viewed from the rear of the rear vehicle body structure according to an exemplary embodiment of the present disclosure.

Referring to FIG. 4 and FIG. 5, The back panel 70 may include a back panel reinforcement flange 72 formed in a "U" shape to form a closed cross-section (C1 shown in FIG. 8) with the rear floor center flange 32 and the rear floor connection flange 34, and curved in the front direction of the vehicle body to be connected with the rear floor 20.

That is, the back panel reinforcement flange 72 is coupled to the rear of the rear floor 20 with the "U" shape corresponding to the rear shape of the rear floor 20 to increase the rear strength of the vehicle body.

A back beam hall 74 is formed on the back panel 70, and the back beam 110 may be coupled to the rear side member 50 through the back beam hall 74.

The back panel 70, as shown in FIG. 1, may be connected to the rear side portion 100, and thus the width direction connectivity of the rear of the vehicle body may be improved through the back panel 70.

The rear vehicle body structure 10 according to an exemplary embodiment of the present disclosure may further include a transverse member 80 coupled to the front of the back panel 70, and connected to the rear side portion 100.

Figure 8:
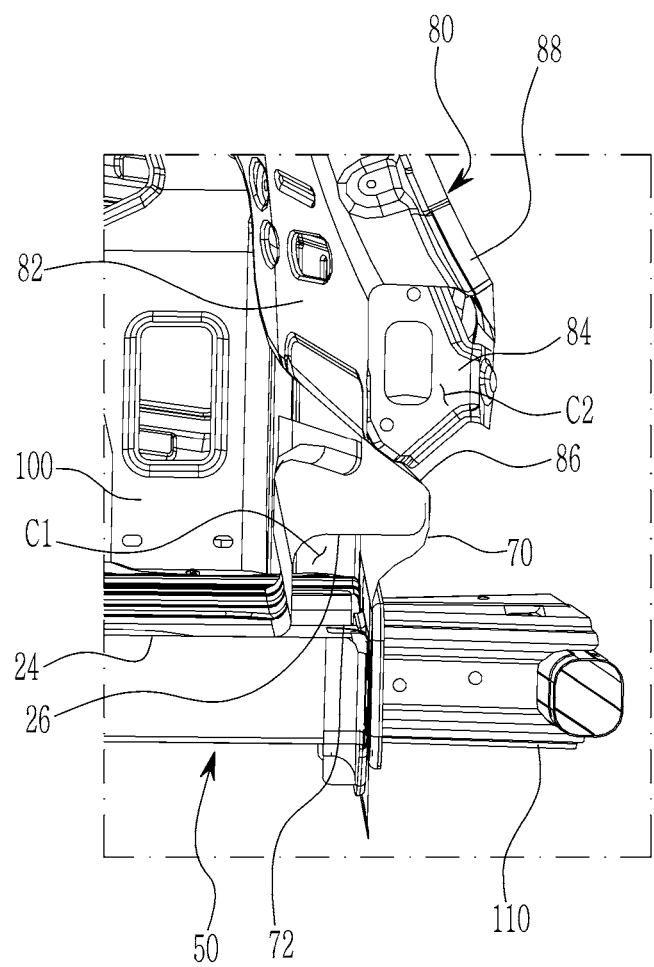
FIG. 8 is a cross-sectional view along the line VIII-VIII of FIG. 1.

The transverse member 80 may include a transverse member body 82 protruded toward the front of the vehicle body to combine with the back panel 70 to form a closed cross-section (C2 shown in FIG. 8).

The rear vehicle body structure 10 according to an exemplary embodiment of the present disclosure may further include a transverse member bulk head 84 provided between the transverse member 80 and the back panel 70.

The transverse member bulk head 84 increases the connectivity between the transverse member 80 and the back panel 70, and can suppress vehicle body deformation in a rear collision.

The transverse member 80 may further include a transverse member lower flange 86 which is curved from the transverse member body 82 and engages with the back panel 70, and a transverse member upper flange 88 that is curved from the transverse member body 82 and connected with the back panel 70.

The transverse member lower flange 86 may be connected with the extension flange 36.

Figure 6:
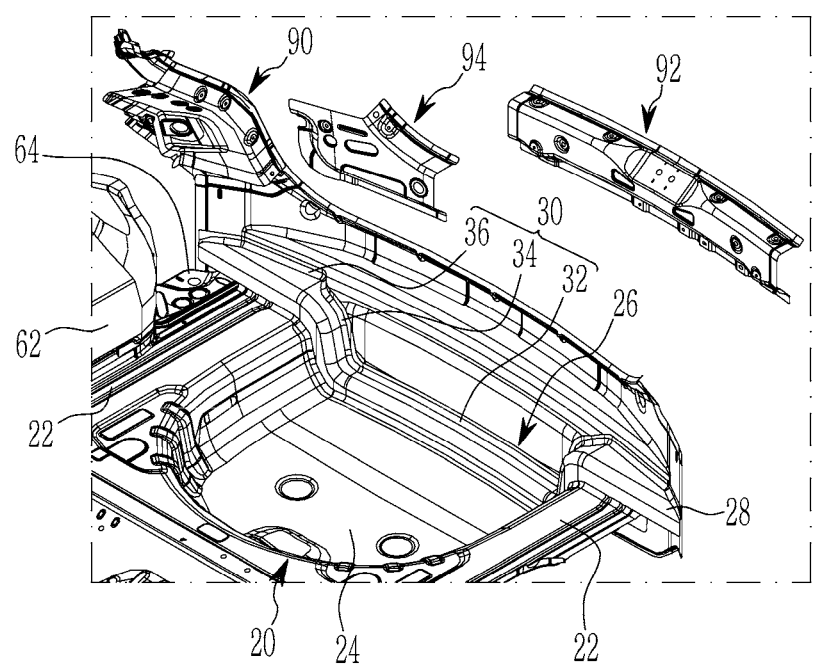
FIG. 6 is a partially exploded perspective view of the rear vehicle body structure according to an exemplary embodiment of the present disclosure.

FIG. 6 is a partially exploded perspective view of the rear vehicle body structure according to an exemplary embodiment of the present disclosure.

Referring to FIG. 6, the transverse member 80 may include a transverse member side portion 90 connected with the rear side portion 100, a transverse member central portion 92 disposed in the vehicle body width direction, and a transverse member connection 94 connecting the transverse member side portion 90 and the transverse member central portion 92.

The transverse member 80 is configured to be coupled to a door at the rear of the vehicle body, for example, a tailgate, and the transverse member side portion 90, the transverse member central portion 92 and the transverse member connection 94 may connect both side of the rear side portion 100 to increase the connectivity in the width direction of the vehicle body and to secure the rear rigidity of the vehicle body.

Figure 7:
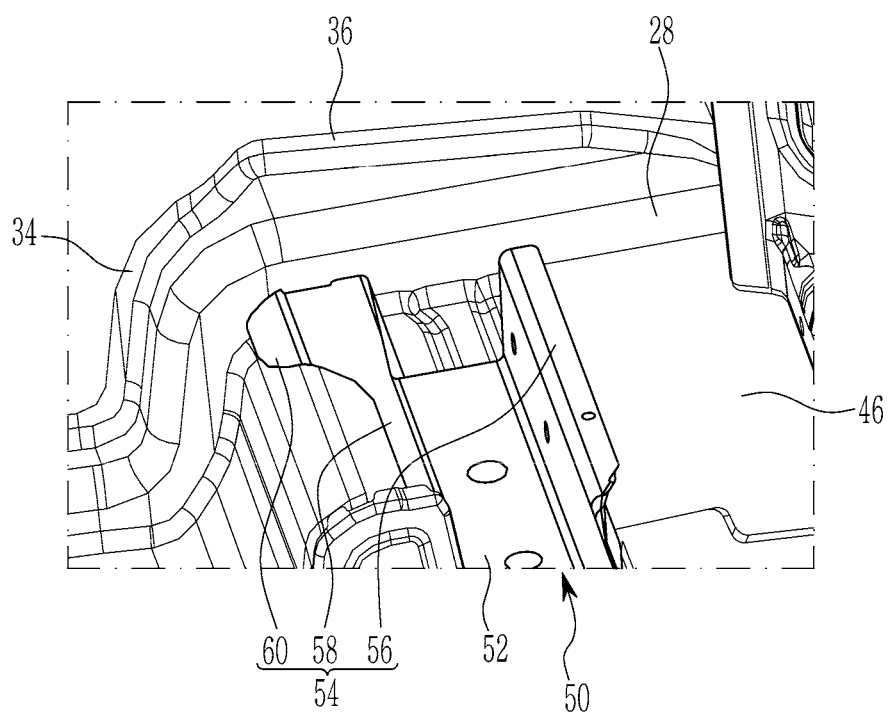
FIG. 7 is a partial perspective view viewed from the bottom of the rear vehicle body structure according to an exemplary embodiment of the present disclosure.

FIG. 7 is a partial perspective view viewed from the bottom of the rear vehicle body structure according to an exemplary embodiment of the present disclosure.

Referring to FIG. 3, FIG. 4 and FIG. 7, the rear side member 50 may include a rear side member body 52 formed as a "U"-shaped cross-section along a vehicle body length direction, and a rear side member flange 54 formed to be bent from the rear side member body 52.

The rear side member flange 54 may include a rear side member outer flange 56 connected with the lower of the rear floor side portion 22 and the rear side portion 100, and a rear side member inner flange 58 connected with the bottom surface of the rear floor 20.

Referring to FIG. 1, the rear vehicle body structure 10 according to an exemplary embodiment of the present disclosure may further include a rear wheel housing 62 connected with the rear side portion 100 and the rear floor 20, and a wheel housing connection 64 connected with the rear side portion 100, the rear wheel housing 62 and the rear side member outer flange 56. That is, the rear side member outer flange 56 may be connected to the rear side portion 100 through the wheel housing connection 64.

Referring to FIG. 7, the rear portion of the rear side member inner flange 58 may include an inner flange extension 60 formed to extend inside the vehicle body. The inner flange extension 60 may further increase the connection characteristic between the rear floor 20 and the rear side member 50 without a separate connecting member.

Referring again to FIG. 3 and FIG. 4, the rear vehicle body structure 10 according to an exemplary embodiment of the present disclosure may further include a side member bulk head 66 connecting the rear side member body 52 and the rear floor 20. The side member bulk head 66 may increase connection characteristic between the rear floor 20 and the rear side member 50, and suppress deformation of the rear floor 20.

FIG. 8 is a cross-sectional view along the line VIII-VIII of FIG. 1.

Referring to FIG. 8, the back panel reinforcement flange 72 of the back panel 70 and the rear floor transverse reinforcement 26 may form a closed cross-section C1 to increase the connectivity and strength of the rear of the vehicle body.

In addition, the transverse member body 82 and the back panel 70 of the transverse member 80 form a closed cross-section C2, thereby increasing the connectivity and strength of the rear of the vehicle body.

Figure 9:
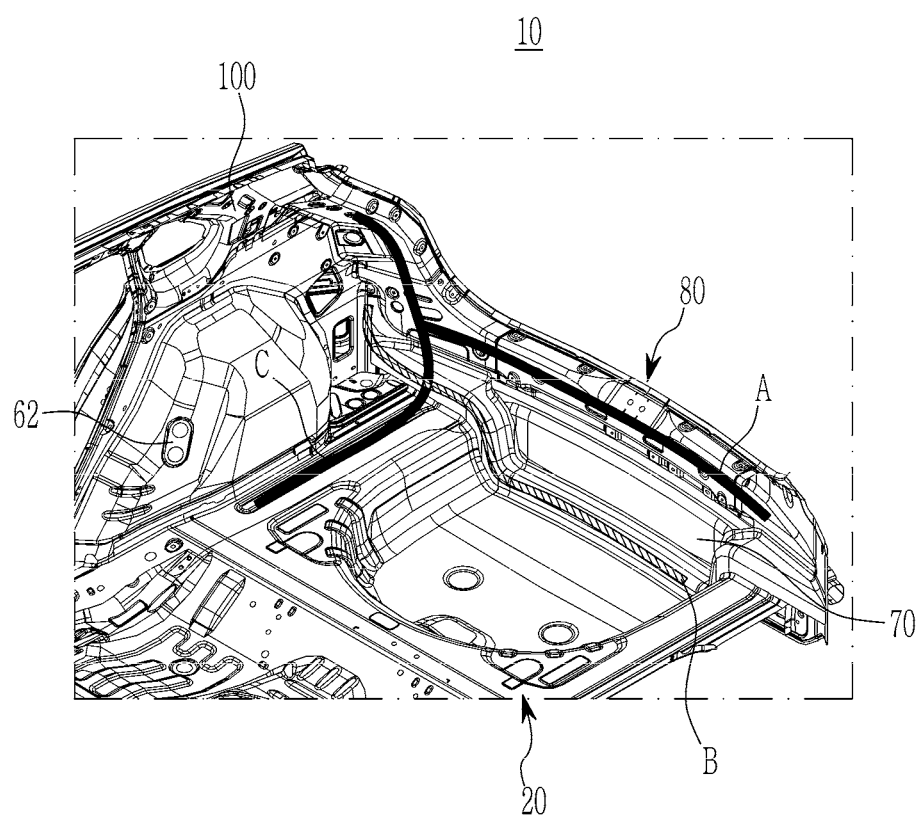
FIG. 9 is a perspective view showing the road path of the rear vehicle body structure according to an exemplary embodiment of the present disclosure.

FIG. 9 is a perspective view showing the road path of the rear vehicle body structure according to an exemplary embodiment of the present disclosure.

As shown in FIG. 9, the rear vehicle body structure 10 according to an exemplary embodiment of the present disclosure may have a road path in vehicle body width direction (A), a road pass formed at the rear of the rear floor 20 (B) and a road path (C) in the vertical direction and vehicle body length direction behind the vehicle body.

That is, the rear vehicle body structure 10 according to an exemplary embodiment of the present disclosure has a multi-annular connection structure, so that the vehicle body rear collision load transmission is smooth and the deformation of the vehicle body can be suppressed.

The rear vehicle body structure 10 according to an exemplary embodiment of the present disclosure has the closed connection structure of the back panel 70, the transverse member 80, the D-pillar part, and the rear side portion 100, it is possible to respond to twisting of the tail gate opening and secure vehicle body strength.

The rear vehicle body structure 10 according to an exemplary embodiment of the present disclosure can be connected without a separate member for the connection of the rear floor 20, the rear side member 50 and the back panel 70, so that the vehicle body production process can be simplified.

In the rear vehicle body structure 10 according to an exemplary embodiment of the present disclosure, the battery can be mounted on the tire wall 24 by securing the strength of the rear of the vehicle body. By adjusting the layout of the battery mount part, the battery can be mounted on the rear part of the vehicle body without a separate member for battery mount.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A rear vehicle body structure comprising:
   a rear side member connected to a back beam positioned at a rear of a vehicle body;
   a rear floor including a rear floor side portion connected to the rear side member, a tire wall formed with a concave step from the rear floor side portion, and a rear floor transverse reinforcement protruding along the shape of the rear floor side portion and the tire wall from a rear of the rear floor side portion and the tire wall;
   a back panel connected with a rear of the rear floor;
   wherein the rear floor further comprises a rear floor rear flange that is curved away from the rear floor transverse reinforcement and connected with the back panel;
   wherein the rear floor rear flange comprises:
     a rear floor center flange formed in a vehicle body width direction at a position corresponding to the tire wall; and
     a rear floor connection flange curved upward from the rear floor center flange;
   wherein the back panel comprises a back panel reinforcement flange bent in the forward direction of the vehicle body to form a closed cross-section with the rear floor center flange and the rear floor connection flange with a "U" shape, and to be connected with the rear floor.

2. The rear vehicle body structure of claim 1, further comprising a rear side portion positioned on the side of the vehicle body, wherein the rear floor transverse reinforcement includes a reinforcement extension extending in the vehicle body width direction and connected with the rear side portion.

3. The rear vehicle body structure of claim 2, further comprising a transverse member connected to a front of the back panel and the rear side portion.

4. The rear vehicle body structure of claim 3, wherein the transverse member includes a transverse member body protruding toward the front of the vehicle body to combine with the back panel to form a closed cross-section.

5. The rear vehicle body structure of claim 4, further comprising a transverse member bulk head provided between the transverse member and the back panel.

6. The rear vehicle body structure of claim 4, wherein the transverse member further includes:
   a transverse member lower flange curved from the transverse member body and connected with the back panel; and
   a transverse member upper flange curved from the transverse member body and connected with the back panel.

7. The rear vehicle body structure of claim 6, wherein the transverse member lower flange is connected with the extension flange.

8. The rear vehicle body structure of claim 4, wherein the transverse member includes:
   a transverse member side portion engaged with the rear side portion;
   a transverse member central portion disposed in the vehicle body width direction; and
   a transverse member connection connecting the transverse member side portion and the transverse member central portion.

9. The rear vehicle body structure of claim 2, wherein the rear side member includes:
   a rear side member body formed as a "U" cross-section along the vehicle body length direction; and
   a rear side member flange curved away from the rear side member body.

10. The rear vehicle body structure of claim 9, wherein the rear side member flange includes:
    a rear side member outer flange connected with the lower of the rear floor side portion and the rear side portion; and
    a rear side member inner flange connected with the bottom surface of the rear floor.

11. The rear vehicle body structure of claim 10, further comprising:
    a rear wheel housing connected with the rear side portion and the rear floor; and
    a wheel housing connection connected with the rear side portion, the rear wheel housing and the rear side member outer flange.

12. The rear vehicle body structure of claim 10, wherein:
    the rear portion of the rear side member inner flange includes an inner flange extension extending inside the vehicle body.

13. The rear vehicle body structure of claim 9, further comprising a side member bulk head connecting the rear side member body and the rear floor.

14. The rear vehicle body structure of claim 1, wherein the rear floor rear flange comprises:

an extension flange formed along the reinforcement extension by being curved away from the rear floor connection flange.

15. The rear vehicle body structure of claim 1, wherein the back panel is connected to the rear side portion.

* * * * *